United States Patent [19]

Olson

[11] Patent Number: 5,037,599

[45] Date of Patent: Aug. 6, 1991

[54] SINGLE DIAPHRAGM FORMING OF DRAPEABLE THERMOPLASTIC IMPREGNATED COMPOSITE MATERIALS

[75] Inventor: Steven H. Olson, Charlotte, N.C.

[73] Assignee: BASF Aktiengesellschaft, Lidwigshafen, Fed. Rep. of Germany

[21] Appl. No.: 371,111

[22] Filed: Jun. 26, 1989

[51] Int. Cl.⁵ .................... B29C 51/10; B29C 51/12; B29C 51/28

[52] U.S. Cl. .................................. 264/510; 264/136; 264/297.4; 264/316; 425/389

[58] Field of Search ............... 264/510, 511, 512, 316, 264/297.4, 297.8, 136; 425/388, 389, 405.1

[56] References Cited

U.S. PATENT DOCUMENTS

| | | | |
|---|---|---|---|
| 4,562,033 | 12/1985 | Johnson et al. | 264/510 |
| 4,608,220 | 8/1986 | Caldwell et al. | 264/512 |
| 4,770,838 | 9/1988 | Cattanach et al. | 264/510 |
| 4,942,012 | 7/1990 | Lee et al. | 264/512 |

FOREIGN PATENT DOCUMENTS

86/07005 12/1986 PCT Int'l Appl. .................. 264/511

Primary Examiner—Jan H. Silbaugh
Assistant Examiner—Catherine Timm
Attorney, Agent, or Firm—William G. Conger

[57] ABSTRACT

A process for preparing non-planar thermoplastic fiber reinforced composites utilizes drapeable thermoplastic impregnated fiber reinforced prepregs in a pressure thermoforming process employing but one diaphragm. The single diaphragm when initially used is flat, but becomes deformed, following its first use, to the shape of the finished part. The diaphragm thus deformed may be repeatedly used as it will still fit over the prepreg layup.

11 Claims, 2 Drawing Sheets

SINGLE DIAPHRAGM FORMING OF DRAPEABLE THERMOPLASTIC IMPREGNATED COMPOSITE MATERIALS

BACKGROUND OF THE INVENTION

1. Field of the Invention

The subject invention pertains to the field of thermoplastic composites. More particularly, the subject invention pertains to a process for forming non-planar thermoplastic composites wherein drapeable thermoplastic prepregs are layed up and fused under a pressure differential in a thermoforming operation utilizing but a single diaphragm.

2. Description of the Related Art

Thermoplastic composites are becoming increasingly important items of commerce in the transportation and aerospace industries. Thermoplastic composites containing advanced engineering thermoplastics such as the polyarylene sulfides, polyimides, polyetherimides, polysulfones, polyetherketones and the like are superior in some respects over their thermosetting analogues due to their greater impact resistance and in some cases, greater solvent resistance. Unfortunately, the use of thermoplastic composites has been limited due to difficulties in fabrication of parts, especially parts of complex shape. This difficulty is due in large part to the nature of the thermoplastic impregnated prepreg itself, but also to the process by which layups containing these prepregs are fused to form an integral composite part.

In U.S. Pat. No. 4,770,838 for example, is disclosed a process of forming non-planar thermoplastic composite parts which has become standard in the industry. According to this process, a layup containing layers of unidirectional, woven, or random mat fiber-reinforcement which has been melt or solution impregnated with an engineering thermoplastic is sandwiched between two diaphragms of metal or high temperature plastic forming a very stiff, flat layup. This layup is then clamped into the mold and vacuum applied between the diaphragms with a vacuum ring assembly while heating to the melting temperature of the thermoplastic. Pressure is then applied to one side of the layup, and optionally, vacuum may be applied to the other side of the layup. As a result of the pressure and temperature, the entire layup is deformed into the shape of the mold surface.

Following cooling, the diaphragms are removed and of necessity discarded, as they have also been deformed to the shape of the part and cannot be reused to form a flat layup. As the diaphragm material is expensive, this process is quite wasteful. Moreover, the deformation of a flat layup into a complex part, particularly those with sharp corners, results in the partial separation of fibers, creating non-uniform cross-sections, resin rich and resin poor, or resin starved areas, and associated therewith, unpredictable physical properties.

SUMMARY OF THE INVENTION

A process for forming non-planar thermoplastic composites from drapeable prepregs has now been discovered which avoids the foregoing difficulties. This process, which uses but a single diaphragm, is capable of preparing prepregs of complex cross-section without fiber separation and without causing differences in composite thickness. Moreover, the process allows the reuse of the expensive diaphragm material.

BRIEF DESCRIPTION OF THE DRAWINGS

FIG. I illustrates a commonly used double diaphragm molding process.

FIG. II illustrates the process of the subject invention wherein drapable prepregs are utilized with but a single diaphragm.

Figure 1:
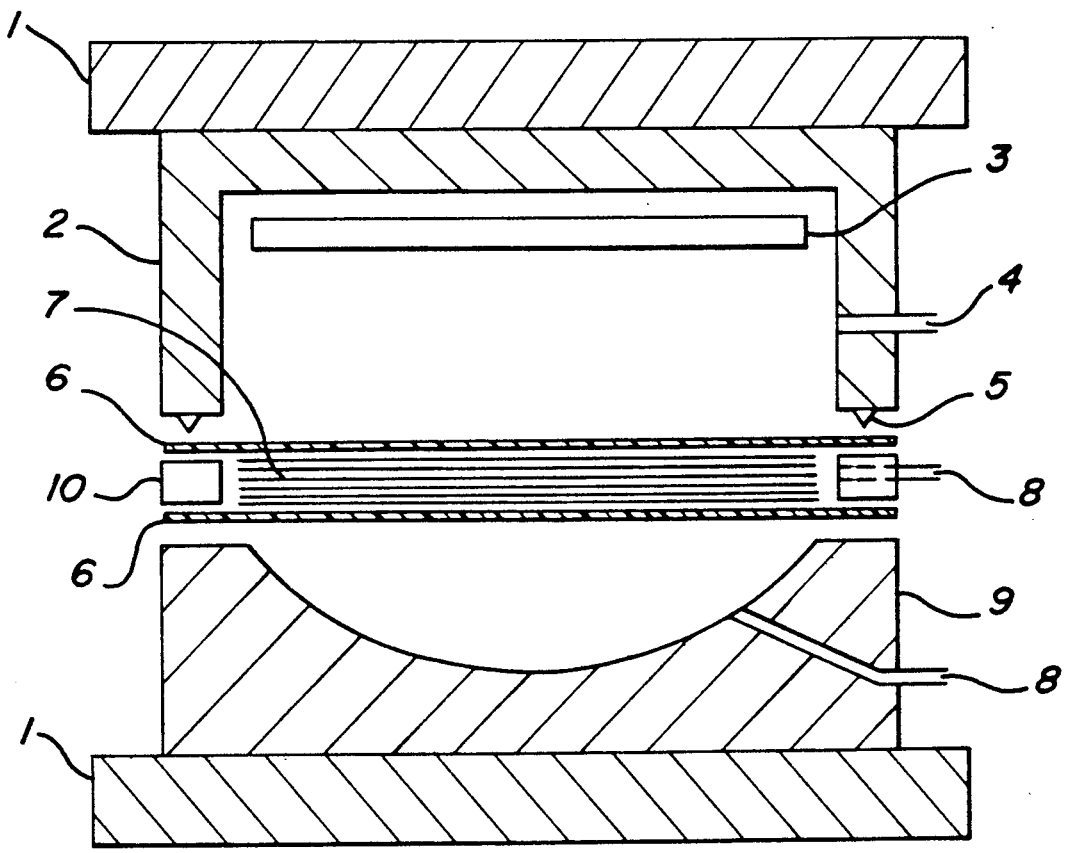
Figure 2:
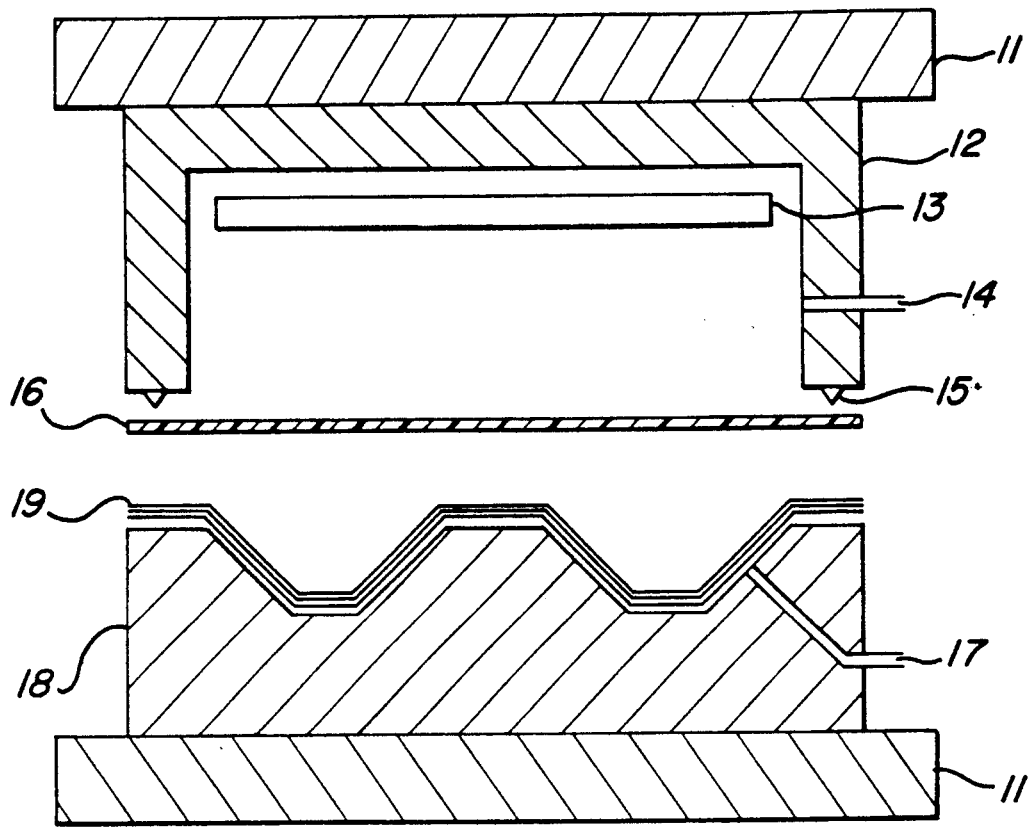
Figure 3:
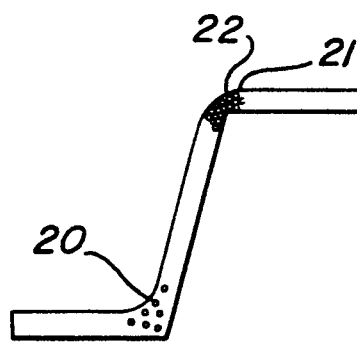
Figure 4:
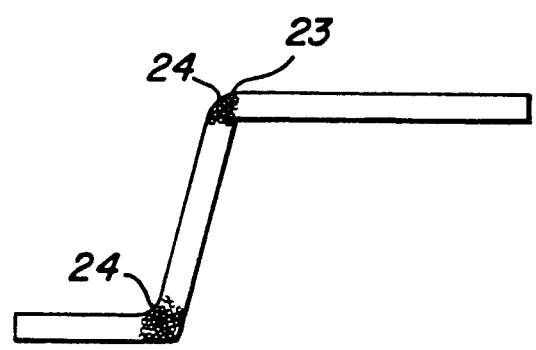

FIG. III illustrates the differences in cross-section thickness and fiber content associated with traditional molding, while FIG. IV illustrates the improvements made possible with the present invention.

DESCRIPTION OF THE PREFERRED EMBODIMENTS

The practice of the subject invention requires that the prepregs be drapable. Such prepregs may be prepared, for example, by impregnating fiber reinforcement with thermoplastic powders as taught by European published application EP-A-289,591; by hybrid yarn prepregs containing thermoplastic in the form of comingled fibers as taught by European patent EP-B-O 156 599, or as wrapped or interwoven reinforcing and thermoplastic fibers as taught by European patent EP-A-O 138 294. Of course combinations of these methods of obtaining thermoplastic content are possible, as long as the product is drapeable.

By drapeable is meant that the prepreg may readily be deformed to fit the shape of the molded product without separating or breaking apart significantly or springing back to the original orientation. The term drapeable is a term well known to those skilled in the art of fiber reinforced composites. The thermoplastic prepregs of the previous paragraph all have suitable drape, with the drape of the comigled or hybrid yarn type being generally superior to those of the comingled or powder impregnated type. The term hybrid yarn is inclusive of yarn containing both reinforcing fibers and thermoplastic fibers however these are prepared.

However, traditional thermoplastic prepregs prepared by melt or solution impregnation of reinforcing fibers do not have appreciable drape but rather are stiff or "boardy", more especially when assembled into layups containing from 16 to 32 or more plies. These prepregs are not suitable for the practice of the subject invention.

The thermoplastics suitable for use in the thermoplastic impregnated prepregs may be selected from a wide variety of engineering thermoplastics including polyamides, liquid crystalline polyesters, polysulfones, polyethersulfones, polyetherketones, polyarylene sulfides, polyimides, polyetherimides, polyesterimides, polybenzimidazoles, and the like. Preferably, the glass transition or melting temperature of the thermoplastic is greater than 150° C., preferably greater than 200° C., or most preferably 250° C. or higher. The melt or softening temperatures are also suitably high, preferably greater than 300° C., and more preferably greater than 350° C. Such thermoplastics are available commercially in a number of molecular weights, monomer types, and physical forms.

The reinforcing fibers suitable for the practice of the subject invention include carbon fibers of high, medium, and low modulus, glass fibers, aramid fibers, boron fibers, silicon carbide fibers, and the like. Blends of these fibers may also be used. The fibers should be continuous and in the form of unidirectional tows or roving, unidirectional tape, woven fabric or non-woven (random) mat. The preparation of the drapeable thermoplastic impregnated prepregs forms no part of the subject invention. Such products are commercially available from numerous sources.

The diaphragm materials used for the practice of the subject invention may be selected from ductile metals having high elongation, or from high temperature thermoplastics with this characteristic. Examples of metal diaphragm materials are VACALLOY® type DD aluminum and SPF aluminum both of which have elongations of 200 percent or more at temperatures of 300°-400° C. These metal diaphragms are generally used in thicknesses of from 0.1 to about 2.0 mm in thickness, preferably 0.1 to about 0.25 mm in thickness. The metal diaphragms tend to give higher surface quality to the final part than do thermoplastic diaphragms.

Many thermoplastics are suitable for use as diaphragms depending upon the melt temperature of the thermoplastic matrix of the prepreg. For example, if nylon were the matrix resin, then films of polyarylsulfone or polyetherketone might be suitable. However, for most aerospace applications, high melting thermoplastics are used as the matrix resin and hence the thermoplastic diaphragms must possess very high softening temperatures themselves. Generally used thermoplastic diaphragms are KAPTON® polyimide, a product of the E. I. Dupont DeNemours Company, and UPILEX® polyimide, a product of UBE Industries, Ltd. KAPTON® H film has an elongation of 100 percent at 300° C. while UPILEX® R film has an elongation of 250 percent at 300° C. These films are available in thicknesses of from 0.025 to 0.127 mm.

Because of the decrease in surface quality associated with thin films, often five or more of such thermoplastic films are stacked together to form the diaphragm. Because the diaphragms of the subject invention are reusable, diaphragm stacks of 5 or even more films are economically viable. As utilized herein, the term "single diaphragm" is meant to describe the use of a diaphragm on the side or sides of the mold which are subjected to a positive pressure differential and is not descriptive of a single, unitary layer of diaphragm material. A single diaphragm may contain many layers. In practice, both the metal and plastic diaphragms are generally coated with a suitable silicone or other release coating.

The molds useful in the practice of the subject invention are well known to those skilled in the art. Suitable molds are generally constructed of metals or of monolithic graphite. When fugitive forms are required, these may be made, for example, of foundry sand or plaster. The pressure necessary to be applied to the diaphragm side of the mold may be constrained by the top portion of the mold itself, or the diaphragm may be clamped to the bottom of the mold along its perimeter and placed in a suitable pressure autoclave. The pressure required on the diaphragm side is generally from 100-200 psi (0.69-1.38 MPa), and is limited by the material of the autoclave or mold rather than the process itself. A practical, but not theoretical, upper limit is c.a. 300 psi (2.07 MPa). Of course, the elongation of the diaphragm and its other physical properties must be taken into consideration. With diaphragms of UPILEX® polyimide or aluminum, no problems due to excessive pressure are generally encountered.

The temperature to which the mold is heated is related directly to the nature of the thermoplastic matrix resin. The temperature must be such that at the molding pressure, the thermoplastic matrix becomes coherent. Generally this requires at least a temperature equal to the melt temperature of the matrix resin. For example, when PEEK® polyetheretherketone thermoplastic is used as the matrix resin, the mold is generally heated to at least the melt temperature $T_m$ of 650° F. (343° C.), and preferably between 730° F. and 750° F. (388° C. and 399° C. respectfully). After maintaining this temperature for a time period of from 5 minutes to 60 minutes, the mold is then cooled at a rate of from 10°-80° F./minute (5°-45° C./minute).

A typical molding cycle might be to heat the mold to the diaphragm deformation temperature (when thermoplastic diaphragms are used) and then to pressurize the mold to the desired consolidation pressure while increasing the temperature to the thermoplastic matrix melt temperature. When the melt temperature is achieved, generally after 20-25 minutes, the temperature is maintained for 5-60 minutes following which the temperature is gradually lowered. The dwell time is pressure and temperature dependent. When the temperature falls below the melt temperature, the pressure may be gradually released as well.

Referring now to the drawings, FIG. I represents the traditional double diaphragm process. The mold (9) is sandwiched between platens (1) and pressure chamber (2). Heat is applied by heating means (3) which may, for example, be radiant heat, a heating blanket, or other means, while pressure is applied through the pressure inlet (4). Pressure and vacuum are maintained by means of sealing ring (5), which in many cases is superfluous. Vacuum is drawn through vacuum outlet (8) and vacuum ring assembly (10). The layup of melt or solution impregnated prepreg (7) is sandwiched between diaphragms 6. As the temperature increases, the pressure forces the prepreg down into the mold cavity. After cooling and release of pressure, the molded part may be removed.

The subject invention process is illustrated by FIG. II. The process has a great deal of similarity with that of FIG. I, except that the prepreg layup (19) is made of drapable thermoplastic prepregs which line the mold cavity. The single diaphragm (16) when initially used is flat as shown, but becomes deformed, following its first use, to the shape of the finished part. The diaphragm thus deformed may be repeatedly used as it will still fit over the prepreg layup. In the case of the subject process, the temperature is raised to the deformation temperature of the thermoplastic diaphragm (16) before pressure is applied in order that rupture of the diaphragm into the cavity is prevented. Upon the second use of the same diaphragm, however, this is less important, as the shape already conforms to that of the cavity. The remaining elements of FIG. II are the same as shown in FIG. I, but are numbered consecutively. Thus (11) are the platens, (12) the pressure chamber, (13) the heating element, (14) the pressure inlet, (15) the sealing ring, (16) a single diaphragm, (17) the vacuum outlet, (18) the mold, and (19) the drapeable thermoplastic prepreg.

FIG. III shows the effect commonly found in shaped composites prepared with stiff prepregs and using the double diaphragm method, wherein the fibers (21) parallel to the hat-section corner separate to form a fiber-poor zone (22). This separation has been shown to occur in both unidirectional, as well as woven fiber reinforcement. At the same time, a thermoplastic rich fillet is formed in the concavity at (20). By way of contrast, the uniform fiber and thermoplastic distributions at (23) and

(24) in FIG. IV represent the result of using the subject process.

An additional advantage to the subject process is that complex shapes such as aircraft hatches which customarily contain reinforcing ribs, can be made in but one operation whereas the same hatch when prepared by the double diaphragm process has required five separate steps.

A further advantage to the subject process is that the prepregs may be wet with water prior to layup. When wet, the flexibility and drape of the prepregs is improved still further, aiding in the layup over and/or around sharp corners and into crevices. Because no lower diaphragm is used, the water or other volatile solvent is easily drawn off long before the thermoplastic matrix fuses. Layup of drapeable prepregs with the aid of water is a preferred embodiment of the subject invention.

EXAMPLE 1

A 16 ply layup of PEEK 150/AS-4 comingled 8-harness satin woven fiber is layed up over a double hat section mold. The prepregs are sprayed with water prior to layup to increase their drapeability and provide some tack. The three dimensional corners of the mold surface present no difficulty in layup as the drapeable fabric conforms easily to most very complex shapes. The wet layup is dried at 250° F. (121° C.) for 2 hours. Following layup, a single diaphragm of 5 layers of 0.005 inch (0.127 mm) UPILEX ® R film coated with FREKOTE ® 44 release coating is layed flatwise atop the layup, following which the pressure chamber top of the mold is clamped into position. Heat is supplied by an electric blanket separated from the diaphragm by a layer of fiberglass insulation. Heat is applied at moderate vacuum (5 inches Hg, 16.9 KPa) until the temperature reaches 650° F. (343° C.) following which full pressure of 100-200 psi (0.69-1.38 MPa) is applied as the temperature is increased to the PEEK ® melting range of 730°-750° F. (388°-399° C.). This temperature is maintained for ten to thirty minutes following which the part is cooled at a rate of 10°-80° F./minute (5°-45° C./minute). Following demolding, the UPILEX ® R diaphragm is deformed to the shape of the side of the finished composite which is nearest to the diaphragm and hence the pressure side of the molding apparatus.

EXAMPLE 2

A layup is made as in Example 1, but the same diaphragm, deformed as a result of its use in Example 1, is used. Following demold, the part quality is the same as in Example 1 with no fiber or thermoplastic starved or rich areas. The diaphragm is still suitable for reuse.

EXAMPLE 3

The procedure of Example 1 is followed, but the prepreg is unidirectional IM7 carbon fiber, powder impregnated with the Polyimide New-TPI, a product of Mitsui Toatsu. An aluminum diaphragm is used. Light vacuum is maintained at 650° F. (343° C.) following which full pressure of 150-200 psi (1.03-1.38 MPa) is applied and the temperature increased to 760° F. (405° C.), the processing temperature of the thermoplastic polyimide. Following cooling, the aluminum diaphragm is suitable for reuse in the same mold.

The embodiments of the invention in which an exclusive privilege or property is claimed are defined as follows:

1. A process for repetitive thermoforming for the preparation of non-planar fiber reinforced thermoplastic composites, comprising:
   a. selecting a tool having surface contours identical to one face of the composite desired to be prepared;
   b. laying upon the tool surface one or more layers of a drapeable prepreg;
   c. employing not more than one deformable, planar diaphragm located on the side of the drapeable prepreg laid up in step (b) most remote from the tool surface;
   d. establishing a pressure differential between the side of the diaphragm most remote from the tool surface and the tool or surface of the prepreg adjacent to the tool and heating the prepreg laid up in step (b) to a processing temperature under conditions such as to fuse and consolidate thermoplastic located within the prepreg and form an integral thermoplastic fiber reinforced composite part; such that the planar diaphragm has been deformed to coincide with the surface of the composite part most remote from the tool;
   e. removing said deformed diaphragm and said integral composite part from the tool;
   f. selecting the same tool utilized in step (a) for a repetition of the thermoforming process and then;
   g. repeating step (b);
   h. employing as a diaphragm the non-planar, deformed diaphragm formed in step (d) on the side of the prepreg laid up in step (g) most remote from the tool surface;
   i. establishing a pressure differential between the side of the diaphragm most remote from the tool surface and the tool or surface of the prepreg adjacent to the tool and heating the prepreg laid up in step (g) under conditions such as to fuse and consolidate thermoplastic located within the prepreg to form an integral thermoplastic fiber reinforced composite part;
   j. removing said non-planar deformed diaphragm and said integral composite part formed in step (i) from the tool; and
   k. optionally repeating steps (f)-(j).

2. The process of claim 1 wherein said prepregs contain fiber reinforcement selected from the group consisting of glass, carbon, boron nitride, and silicon carbide.

3. The process of claim 1 wherein said prepregs are prepared by powder impregnation of fiber reinforcement or are prepared from hybrid yarn.

4. The process of claim 2 wherein said prepregs are prepared by powder impregnation of said fiber reinforcement or are prepared from hybrid yarn.

5. The process of claim 1 wherein said diaphragm is sealingly clamped to the tool and the pressure differential required for thermoforming is supplied by exposing the side of the diaphragm most remote from the tool to an internal pressure of an autoclave while maintaining pressure on the tool side of the diaphragm at a lesser pressure.

6. The process of claim 1 wherein the drapeability of the prepregs prior to layup is improved by adding thereto a volatile liquid.

7. The process of claim 6 wherein said volatile liquid is water.

8. The process of claim 1 wherein said thermoplastic is selected from the group consisting of polyimides, polyetherimides, and polyarylene polymers wherein aryl groups are separated by sulfide, sulfone, ether, ketone, carbonate, and $C_1$-$C_{10}$ lower alkyl groups or mixtures thereof.

9. The process of claim 8 wherein said thermoplastic is a polyetheretherketone, a polysulfone, a polyethersulfone, a polyphenylene sulfide, a polyether imide, a polyetherketone, a polyimide, or mixtures thereof.

10. The process of claim 1 wherein said diaphragm comprises 1 or more layers of a thermoplastic which is deformable at the processing temperature of step 10(d) but having a fusion temperature above said processing temperature.

11. The process of claim 1 wherein said diaphragm comprises a ductile metal having high elongation.

* * * * *